Figure 1:
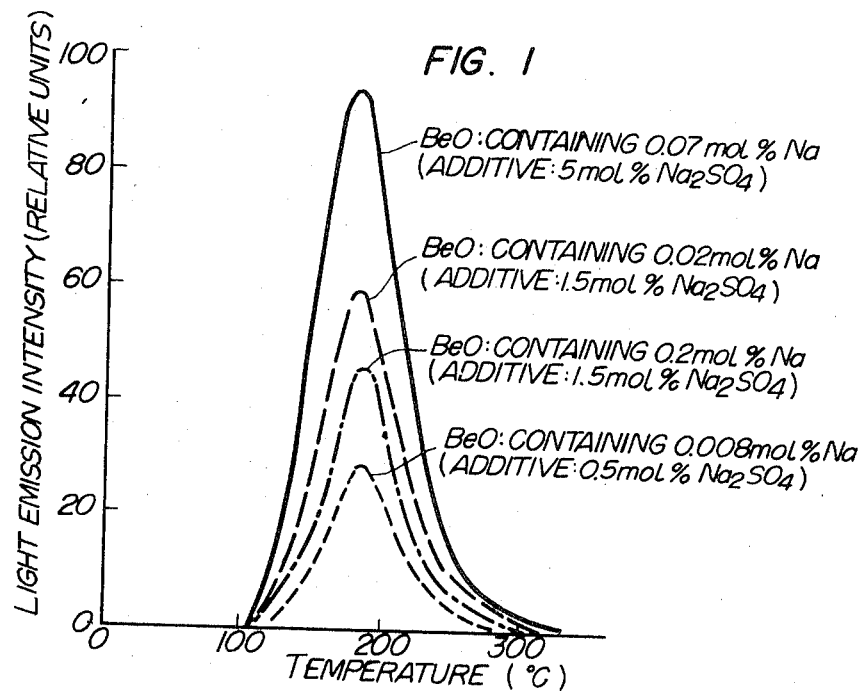

United States Patent
Nada et al.

[15] 3,637,518
[45] Jan. 25, 1972

[54] PHOSPHOR FOR THERMOLUMINESCENT RADIATION DOSIMETER

[72] Inventors: Naohiro Nada, Nishinomiya-shi; Tadaoki Yamashita, Hirakata-shi, both of Japan

[73] Assignee: Matsushita Electric Industrial Co., Ltd., Osaka, Japan

[22] Filed: Mar. 1, 1968

[21] Appl. No.: 709,739

[30] Foreign Application Priority Data

Oct. 12, 1967 Japan..................................42/66211
Oct. 12, 1967 Japan..................................42/66212
Feb. 9, 1968 Japan......................................43/8656

[52] U.S. Cl. ................252/301.4 R, 252/301.4 F, 250/71.5
[51] Int. Cl. ..........................................................C09k 1/10
[58] Field of Search..................250/83 CD, 71.5; 252/301.4

[56] References Cited

UNITED STATES PATENTS 3,463,664  8/1969  Yokota et al.....................252/301.4 P

*Primary Examiner*—Robert D. Edmonds
*Attorney*—Stevens, Davis, Miller & Mosher

[57] ABSTRACT

A phosphor for a thermoluminescent radiation dosimeter, which is composed primarily of beryllium oxide doped with at least one activator selected from the group consisting of lithium, sodium, potassium, silicon, germanium, tin, zinc, cadmium, aluminum, thallium, cadmium and ytterbium, and which is especially adapted for measuring the dose absorbed by a tissue as its effective atomic number is approximately the same as that of the tissue, and has an excellent sensitivity and retention of radiation energy absorbed.

9 Claims, 8 Drawing Figures

PHOSPHOR FOR THERMOLUMINESCENT RADIATION DOSIMETER

The present invention relates to a novel phosphor for a thermoluminescent radiation dosimeter which is especially adapted for use in the measuring of the dose absorbed by the tissue and has an excellent sensitivity and retention of radiation energy absorbed.

In the past, there have been proposed a variety of methods for measuring radiation. A radiation dosimeter primarily resorts to such property of a certain kind of phosphor that absorbs and retains energy commensurate with a radiation dose. Such a phosphor when heated emits the radiation energy absorbed thereby in the form of light, so that by measuring the amount of the light by a suitable instrument, it is possible to obtain the radiation dose.

The relationship between the light emitted by a thermoluminescent phosphor and the temperature of said thermoluminescent phosphor when said thermoluminescent phosphor is heated at a constant rate is represented by the so-called glow curve. The size of the glow curve is related with the sensitivity of the phosphor, while the temperature corresponding to the glow peak is closely related with the absorbed radiation energy retention of the pertinent phosphor. Namely, the greater the glow curve, the better the sensitivity to radiation of a phosphor and the higher the temperature for the glow peak, the better the radiation energy retention of the phosphor is, although the temperature for the glow peak is somewhat variable depending upon the rate at which the phosphor is heated.

The phosphor used in conventional thermoluminescent radiation dosimeters include lithium fluoride (LiF), calcium fluoride doped with manganese ($CaF_2$:Mn) and calcium sulfate doped with manganese ($CaSO_4$:Mn). Of these phosphors, lithium fluoride is most suitably used for quantitatively measuring the radiation dose absorbed by a tissue. This is because lithium fluoride has a radiation-absorbing property similar to that of the tissue by virtue of the fact that the atomic numbers of the constituent elements are low and close to the effective atomic number of the tissue, and therefore exhibits substantially the same sensitivity for X-rays or γ-rays of various wavelengths. However, lithium fluoride has disadvantages in respect of its sensitivity and stability in repetitive measurement. On the other hand, $CaF_2$:Mn and $CaSO_4$:Mn have the drawback that they are not adapted for use in measuring X-rays of an energy smaller than 200 KeV because, since the atomic numbers of the constituent elements thereof are considerably larger than the effective atomic number of the tissue, the measurement error is extremely great, though they do not have the problem of deterioration.

The object of the present invention is to provide a phosphor for a thermoluminescent radiation dosimeter, which has an excellent sensitivity and radiation energy retention, and which is composed primarily of beryllium oxide (BeO) the effective atomic number of which is very close to that of the tissue.

FIGS. 1 to 5 inclusive are charts showing the thermoluminescent glow curves of the thermoluminescent phosphors according to the present invention.

Figure 6A:
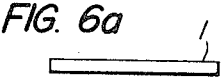

FIG. 6 is a set of views showing thermoluminescent elements produced by the use of the inventive phosphors.

The effective atomic number of beryllium oxide is 7.2 which is close to that of the tissue which is 7.4. Obviously therefore, beryllium oxide is capable of measuring a radiation absorbed by the tissue more efficiently than lithium fluoride whose effective atomic number is 8.1. Now, the process for the production of the inventive phosphor, the properties of the phosphor produced and the method of molding the inventive phosphor, will be described in detail hereinafter. The phosphor according to the present invention consists primarily of beryllium oxide which is doped as an activator with at least one element selected from the group consisting of lithium (Li), sodium (Na), potassium (K), silicon (Si), germanium (Ge), tin (Sn), zinc (Zn), cadmium (Cd), aluminum (Al), thallium (Tl), vanadium (V) and ytterbium (Yb).

These impurities to be used as an activator may be added to the matrix consisting of beryllium oxide by mixing a fine powder of beryllium oxide with a fine powder of the activator homogeneously with stirring and sintering the resultant mixture at elevated temperature. Instead of using beryllium oxide, a salt such as a sulfate of beryllium ($BeSO_4·4H_2O$) may be used as a starting material. The salt may be finally converted into beryllium oxide when subjected to a heat treatment, since it is decomposed into an oxide of beryllium at elevated temperature. Of the impurities, Li and Na may be used in the form of metal or in the form of hydroxide or in the form of such a salt as nitrate, sulfate, carbonate or chloride, instead of oxide thereof. The sintering is necessarily carried out in the temperature range from 1,500° to 2,100° C., because a phosphor having a sufficiently high intensity of thermoluminescence cannot be obtained at a temperature outside the range specified. In order to obtain a satisfactory sintering result and therefore a satisfactory intensity of thermoluminescence, the material mixture is first subjected to a heat treatment at a temperature of 1,500° C. or higher for several hours, removing the resultant agglomerate from the furnace upon cooling, mixing the constituent materials again after pulverizing said agglomerate and sintering the mixture once again at a temperature of 1,500° C. or higher.

The intensity of thermoluminescence of the product phosphor is also influenced by the heating atmosphere used. In general, a slightly oxidizing atmosphere is preferable for obtaining a satisfactory thermoluminescence intensity. The use of a reducing atmosphere will only result in a weak thermoluminescence intensity of the product phosphor. By changing the elements to be added as impurities, phosphors of variable properties can be obtained. A phosphor which is produced by subjecting BeO alone is of course very low in termoluminescence intensity. In practice, a phosphor consisting solely of BeO has a thermoluminescence intensity which is as low as about one hundredth of that of a phosphor which is produced under optimum conditions as will be set forth later. The highest thermoluminescence intensity of phosphor can be obtained when Li, Na or K is used as an additive.

In using Na, the thermoluminescence intensity of a product phosphor is mainly varied depending upon the amount in which it is added and the heat treatment conditions. Besides these factors, the form in which Na is added also has some bearing on the thermoluminescence intensity of the product phosphor. Heat treatment is preferably conducted at a higher temperature and must be within the temperature range from 1,500° to 2,100° C. Use of a temperature lower than that specified will not yield a phosphor having a sufficiently high intensity of thermoluminescence. It is also to be noted that a higher thermoluminescence intensity can be obtained by carrying out the heat treatment in an oxidizing atmosphere, e.g., in the air or in oxygen atmosphere, than in other atmospheres. Heat treatment in a reducing atmosphere, such as argon admixed with 5 percent of hydrogen, will only result in a weak thermoluminescence intensity of the product phosphor. Further, a better result can be obtained by carrying out the sintering for a longer period and the sintering must be effected for at least 1 hour. In practice, however, a period of about 3 hours is sufficient for the sintering. Consequently, the heat treatment is preferably carried out at a temperature of 1,700° C. for 3 hours in the atmosphere. The thermoluminescence intensity of the product phosphor is also altered slightly by the form of Na compound used as an additive, even though the heat treatment is conducted under the same conditions. The highest intensity of thermoluminescence of phosphor can be obtained when Na is used in the form of $Na_2SO_4$. Use of Na in the form of NaOH or $Na_2CO_3$ will only yield a phosphor whose thermoluminescence intensity is lower than that produced using Na in the form of $Na_2SO_4$. Since these sodium salt evaporate when heated to a high temperature, beryllium oxide resulting from sintering at elevated temperature contains only a part of the amount in which Na was initially added. From only the relation between the form of a compound in which Na is added and the thermoluminescence intensity of the product phosphor, it appears that a phosphor of higher thermoluminescence intensity may be obtained by adding Na in the form of a compound which will evaporate in lesser amount at elevated temperature than others.

Now, even when Na is added in the form of $Na_2SO_4$, the resultant thermoluminescence intensity of the product phosphor is variable depending upon the amount of $Na_2SO_4$ added and the thermoluminescence intensity obtained is illustrated in the chart of FIG. 1. In this chart, the curves show the thermoluminescence intensities of the phosphors which were produced by the use of $Na_2SO_4$ in amounts of 15 mol percent, 5 mol percent, 1.5 mol percent and 0.5 mol percent individually and carrying out the sintering at 1,700° C. for 3 hours in the atmosphere. The flame analysis of the beryllium oxides obtained after sintering with $Na_2SO_4$ added in the amounts depicted above, indicated that they contained Na in amounts of 0.07 mol percent, 0.07 mol percent, 0.02 mol percent and 0.008 mol percent respectively. Such an amount of Na which is determined by analysis will hereinafter be referred to as Na content. The best Na content in beryllium oxide after sintering is 0.07 mol percent in concentration, although a slight deviation from said concentration of Na will not give much detrimental affect on the thermoluminescence intensity of the product phosphor. As may be understood from the chart, the thermoluminescence intensity of a phosphor the Na content of which is 0.008 mol percent or 0.5 mol percent, is about one-fifth of that of a phosphor containing 0.07 mol percent of Na, and the thermoluminescence intensities of phosphors having an Na content within the range from 0.005 to 0.5 mol percent are sufficiently high. It will also be seen from the chart of FIG. 1 that the glow curve forms a peak at a temperature of 182° C. indicating that the phosphors are also relatively satisfactory in respect of radiation energy retention. The glow curves shown are drawn based upon the results obtained on heating the phosphors at the rate of 30° C. per minute. The shapes of the glow curves will vary slightly as the heating rate varies. The other glow curves which will be illustrated hereinafter are also drawn based on the measurements taken when the pertinent phosphors were heated at the rate of 30° C. per minute.

Figure 2:
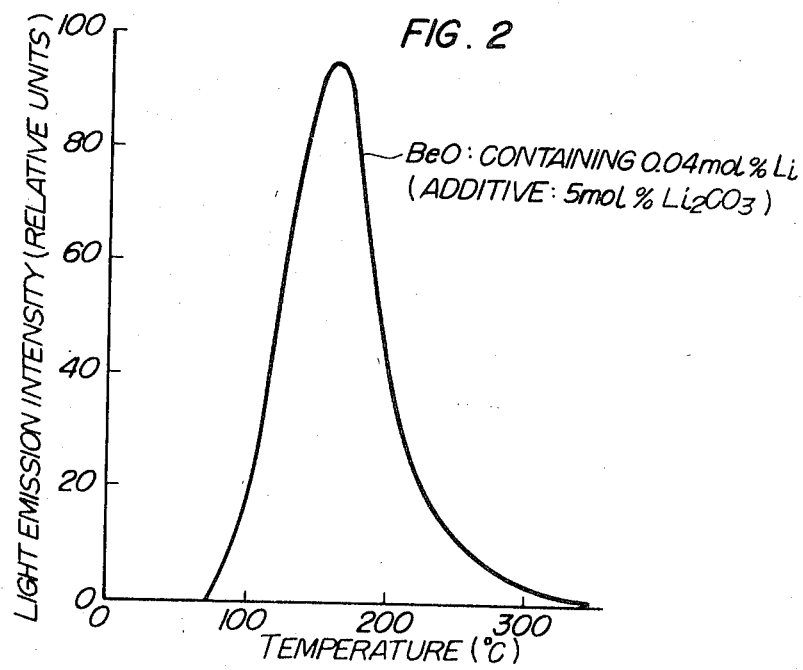

In the case of K, the peak of the glow curve is located at a temperature in the vicinity of about 182° C. and the best content of K is very close to that in the case of Na. In the case of Li, the best content thereof is about the same as that for Na but, unlike the cases of Na and K, the glow curve of a phosphor containing Li forms a peak at a temperature as low as about 162° C. as shown in FIG. 2.

Figure 3:
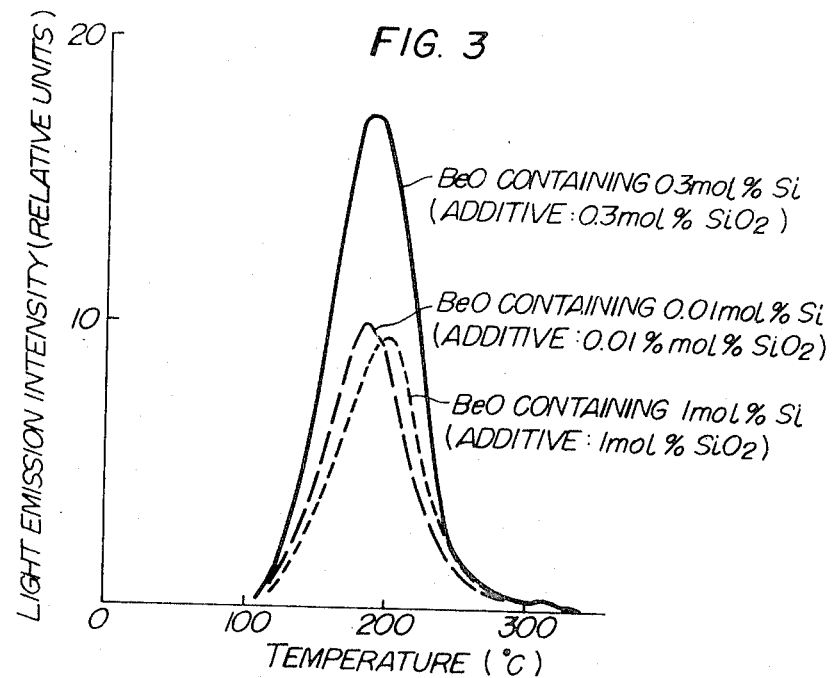

The main glow curves of phosphors produced with the addition of other impurities, i.e., Si, Ge, Sn, Zn, Cd, Tl and V, individually, form a peak mostly at a temperature of 182° C. The thermoluminescence intensities of these phosphors are variable depending upon the impurity element used. When the impurity content is within the range from 0.01 to 3 mol percent, the thermoluminescence intensities of these phosphors are from one-fifth to one-tenth of that of a phosphor containing Na. Some of these phosphors, though inferior to a Na-containing phosphor in respect of thermoluminescence intensity, have a glow peak at a temperature higher than that of Na-containing phosphor and accordingly are superior to the latter in respect of retention of the radiation energy absorbed thereby. The elements which enable a high-glow peak temperature to be obtained are Si and Ge which are elements in IV$b$ Group of the Periodic Table. The phosphors containing Si and Ge have a glow peak at a temperature of about 195° C. As shown in FIG. 3, the thermoluminescence intensity of Si-containing phosphor is satisfactorily high when the Si content is within the range from 0.01 to 5 mol percent and highest when the Si content is about 0.3 mol percent. Si is added in the form of $SiO_2$ which will not substantially evaporate during sintering at elevated temperature. Therefore, Si is contained in the beryllium oxide after sintering in the same amount as was originally added. When Al or Yb is added, the glow curve of the product phosphor forms a subglow peak, in addition to the main glow peak at a temperature of 190° C., at about 310° C. as indicated by a curve ($c$) in the chart of FIG. 4.

Although the foregoing description has been made with particular reference to those phosphors which are produced with the addition of single impurity element, phosphors produced with the addition of two or more elements at the same time exhibit a property which is a combination of the individual phosphors produced with the addition of each of said elements. Therefore, by selecting the elements to be used simultaneously from the group of elements mentioned previously, the property of the product phosphor will not extremely be deteriorated by the addition of an additional element. In some cases, the property of the product phosphor may rather be improved by the use of elements in combination. For instance, by the use of Li in combination with a suitable amount of Si, it is possible to raise the glow peak position to a higher temperature side with no substantial adverse affect on the sensitivity. The same effect can be obtained when at least one element selected from the group consisting of Li, K and Na is used in combination with a small amount of at least one element selected from the group consisting of Si and Ge. However, inclusion of elements other than those depicted previously, e.g., iron (Fe), cobalt (Co) or nickel (Ni), even in a small amount, will result in sharp lowering of the thermoluminescence intensity.

In the foregoing description, use is made of an oxidizing atmosphere for sintering. Use of reducing atmosphere for the sintering, e.g., sintering in argon gas containing 5 percent of hydrogen, will only result in a phosphor having a low thermoluminescence. In this case, however, the thermoluminescence at 200° C. or higher reduces drastically and a phosphor with which a dose can be measured with a small error can be obtained. The glow peak temperature also is also varied somewhat by the type of atmosphere used.

In order that the present invention may be more clearly understood, the present invention will be further illustrated by way of examples thereof but it is to be understood that the present invention is not restricted only thereto.

EXAMPLE 1

Figure 4:
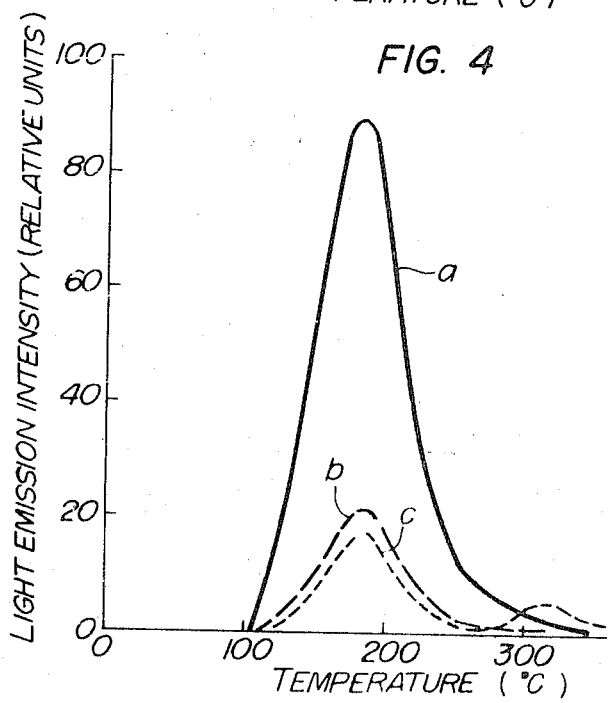

A mixture of 0.1 mol of beryllium oxide (BeO) and 0.005 mol of sodium sulfate ($Na_2SO_4$) was sintered at 1,700° C. for 3 hours in the atmosphere and a thermoluminescent phosphor of a thermoluminescent glow curve as indicated by (a) in the chart of FIG. 4 was obtained. The material beryllium used was a product of Nippon Gaishi Kaisha, Ltd. having a superhigh purity. The beryllium oxide contained Si, Ca and Na as major impurities, the amounts of which are as small as less than 100 p.p.m. respectively. The sodium sulfate used was one which is being sold on the market as a reagent and the purity of this degree is sufficient for use. Describing the process more practically, 0.1 mol of beryllium oxide and 0.005 mol of sodium sulfate, after weighing individually, were mixed and stirred in a commercial mixer to produce a homogeneous mixture. The mixture was placed in a beryllia crucible and sintered in a high frequency furnace at 1,700° C. for 3 hours in the atmosphere. In this case, if the temperature is low, substantially no reaction takes place between beryllium oxide and sodium sulfate, so that sodium will not be diffused into the beryllium oxide. In order to obtain a sufficient diffusion, the sintering should be effected at 1,500° C. or higher and further the reactants should be reduced in particle size to the possible extent beforehand. On the contrary, if the sintering temperature is too high, the sodium sulfate added will evaporate, with the result that only a very small amount of sodium sulfate is present in the beryllium oxide after sintering. The result of the quantitative analysis has revealed that when the sintering is effected at 1,700° C., the amount of sodium contained in the sintered beryllium oxide is only about one-hundredth of that originally added. The sintering can be sufficiently accomplished in a period of about 3 hours. Further, the sintering is preferably carried out in an oxidizing atmosphere such as air or oxygen, and sintering in a reducing atmosphere, such as argon containing 5 percent of hydrogen will only result in an insufficient thermoluminescence intensity of the product phosphor. Use of NaOH or $Na_2CO_3$ in place of $Na_2SO_4$ is not advantageous because these compounds evaporate more intensely than $Na_2SO_4$ during the sintering operation at elevated temperature, enabling only a phosphor of low-thermoluminescence intensity to be obtained.

EXAMPLE 2

A mixture of 0.1 mol of beryllium oxide (BeO) and 0.01 mol of potassium hydroxide was sintered in air at 1,500° C. for 3 hours and a thermoluminescent phosphor was obtained which had a thermoluminescent glow curve essentially similar to the glow curve (a) in FIG. 4. The thermoluminescence intensity of the product phosphor becomes lower as the sintering temperature lowers. For instance, the thermoluminescence intensity of the phosphor obtained by sintering at 600° C. is about one one-hundredth of that of the phosphor obtained by sintering at 1,500° C., and that of the phosphor obtained by sintering at 900° C. is about one-tenth of the latter. The use of a lower temperature for sintering also renders the glow curve of the product phosphor complicated. Namely, the glow curve will form a peak at a temperature of 310° C., in addition to the peak at a temperature of 182° C. In order to obtain a sufficiently high-thermoluminescence intensity, the sintering must be effected at a temperature at least not lower than 1,500° C. The rate of heating or cooling during the heat treatment has substantially no bearing on the thermoluminescence intensity of the product phosphor. However, it should be noted that sintering in a reducing atmosphere of argon gas, containing 5 percent of hydrogen, at 1,500° C. will only result in a phosphor the thermoluminescence intensity of which is about one-half of that of the phosphor obtained by sintering in air.

EXAMPLE 3

A mixture of 0.1 mol of beryllium oxide (BeO) and 0.0001 mol of zinc oxide (ZnO) was processed in the same manner as in example 1 and a thermoluminescent phosphor was obtained whose thermoluminescent glow curve was as indicated by (b) in the chart of FIG. 4.

EXAMPLE 4

A mixture of 0.1 mol of beryllium oxide (BeO) and 0.00005 mol of aluminum oxide ($Al_2O_3$) was processed in the same manner as in example 1 and a thermoluminescent phosphor was obtained whose thermoluminescent glow curve was as indicated by (c) in the chart of FIG. 4.

EXAMPLE 5

Figure 5:
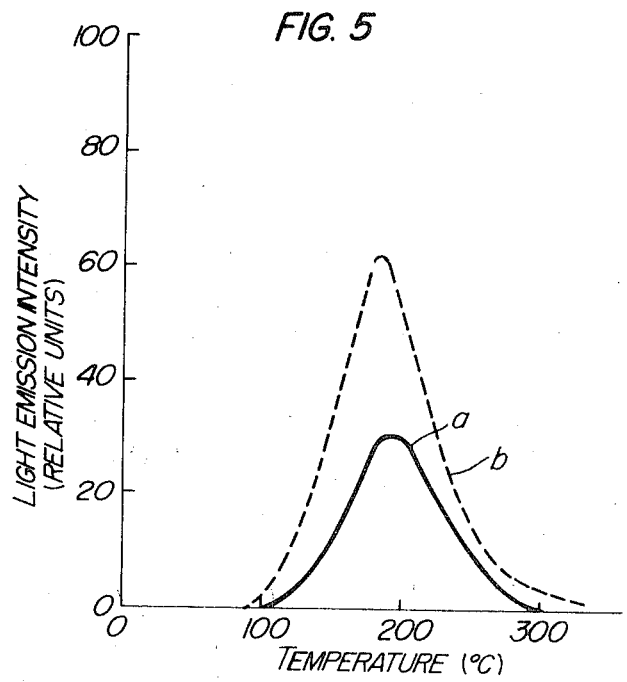

A mixture of 0.1 of beryllium oxide, 0.0002 mol of lithium carbonate ($Li_2CO_3$) and 0.001 mol of silicon oxide ($SiO_2$) was sintered at 1,500° C. for 3 hours in air and a thermoluminescent phosphor was obtained whose thermoluminescent glow curve was as indicated by (a) in the chart of FIG. 5.

EXAMPLE 6

A mixture of 0.1 mol of beryllium oxide (BeO), 0.005 mol of sodium sulfate ($Na_2SO_4$), 0.001 mol of lithium carbonate ($Li_2CO_3$) and 0.0001 mol of aluminum oxide ($Al_2O_3$) was processed in the same manner as in example 5 and a thermoluminescent phosphor was obtained whose thermoluminescent glow curve was as indicated by (b) in the chart of FIG. 5.

To this point, a description has been given as to the method of and the conditions for activating thermoluminescent phosphors. Now, a method of shaping the thermoluminescent phosphors will be described hereinafter. The shaping is necessary to facilitate the handling of thermoluminescent phosphors which in a powdery state are obviously inconvenient in handling.

A first method of producing a shaped thermoluminescent phosphor is to sinter a material mixture after shaping it by cold pressing. In this case, the heat treatment required for the activation of the phosphor and the heat treatment required for the shaping may be accomplished simultaneously and the working efficiency can be improved in this way. In practice, a material mixture consisting of beryllium oxide and an impurity or impurities is homogeneously mixed with stirring and, after shaping by a cold press, the shaped mixture is sintered at a temperature not lower than 1,500° C. to solidify the same. The shaping temperature is variable depending upon the type and amount of the impurity added. For instance, beryllium oxide doped with 10 mol percent of NaOH may be sufficiently shaped at a temperature of 1,600° C. A higher temperature is required for the shaping of beryllium oxide doped with 0.01 mol percent of $Al_2O_3$, i.e., the shaping in this case can be accomplished at a temperature of 1,800° C. or higher. It is to be noted, however, that the shaping can be accomplished at a lower temperature if the beryllium oxide is doped with a small amount of a flux, such as NaOH, in addition to $Al_2O_3$. The shaping temperature may be lowered somewhat by employing a hot press.

A second method of producing a shaped thermoluminescent phosphor is to shroud the surface of a shaped phosphor obtained by cold pressing a thermoluminescent powder or coating the surface of a shaped thermoluminescent phosphor obtained by the first method described above, with glass. This method is particularly advantageously used for producing a shaped thermoluminescent phosphor which is susceptible to deterioration when left to stand in the atmosphere for a prolonged period. In this case, use of a glass having a low melting point is advantageous in working. Further, it is important to use a glass composed of lighter elements. A glass to be used should be composed at least of such elements whose atomic numbers are smaller than that of zinc. Use of a lead-type glass is not satisfactory in respect of radiation absorption because of the large atomic number, although it is low in melting point and easy to work. In practice, silicate- or borate-type glasses are preferably used. Described above are almost all restrictions which are imposed on the composition of the glass used. These glasses or glazes are applied on the surfaces of a BeO sheet material in the form of a dispersion in water and thereafter the glass- or glaze-coated BeO sheet is sintered at a temperature of about 1,000° C. The glazing treatment commonly practiced in the ceramic industry can be applied as such to the coating operation.

A third method of producing a shaped thermoluminescent phosphor is to mix a powdery thermoluminescent phosphor material with a glass powder and then the resultant mixture is heated, whereby the thermoluminescent phosphor material is solidified with the molten glass. The thermoluminescent phosphor obtained by this method is somewhat defective in respect of transparency. Namely, since BeO is dispersed in the glass, the product thermoluminescent phosphor element presents a frosted appearance compared with those produced by the first and second methods described above, and accordingly the thermoluminescent intensity of the phosphor element is reduced to some extent. However, this method is very conveniently used in producing thermoluminescent phosphor elements of various shapes quickly. The methods of producing shaped thermoluminescent phosphor elements described hereinabove will be further illustrated with reference to examples thereof.

EXAMPLE 1

A mixture of 0.01 mol of beryllium oxide (BeO) and 0.0005 mol of sodium sulfate ($Na_2SO_4$) was shaped by cold pressing under a pressure of 1,000 kilograms per square centimeter and the resultant shaped mixture was sintered at 1,700° C. for 3 hours in air. A shaped thermoluminescent phosphor element was obtained as indicated by numeral 1 in FIG. 6a. By this method, a thermoluminescent phosphor of any desired shape can be obtained which is convenient in handling as a dosimeter.

EXAMPLE 2

Figure 6B:
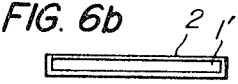

A mixture of 0.01 mol of beryllium oxide (BeO) and 0.0005 mol of lithium carbonate ($Li_2CO_3$) was sintered at 1,700° C. for 3 hours in air and the thermoluminescent phosphor thus obtained was shaped by cold pressing. After coating the surfaces of the shaped phosphor with a glass (a borosilicate glass), a shaped phosphor element was obtained as shown in FIG. 6b wherein numeral 1' designates the shaped phosphor and 2 designates the glass coating. The shaped phosphor element with a glass coating thereon is not toxic to the user, though BeO is slightly toxic per se.

EXAMPLE 3

Figure 6C:

A mixture of 0.01 mol of beryllium oxide (BeO) and 0.00003 mol of silicon oxide ($SiO_2$) was sintered at 1,700° C. for 3 hours in air and the sintered mixture was mixed with a glass powder composed of 72 percent by weight of $SiO_2$, 15 percent by weight of $Na_2O$, 9 percent by weight of CaO, 3 percent by weight of MgO and 1 percent by weight of $Al_2O_3$. The resultant mixture was heated at 1,000° C. for 1 hour in air and a shaped phosphor element as shown in FIG. 6c was obtained. In the Figure, numeral 1' designates the thermoluminescent phosphor and 2' designates the glass. The shaped phosphor element of this type is also advantageous in that it is not toxic to the user as in the preceding example.

What is claimed is:

1. A phosphor for a thermoluminescent radiation dosimeter, consisting primarily of beryllium oxide doped with 0.005 to 0.5 mol percent of at least one activator selected from the group consisting of lithium, sodium and potassium and 0.01 to 5 mol percent of at least one activator selected from the group consisting of silicon and germanium.

2. A phosphor for a thermoluminescent radiation dosimeter, consisting primarily of beryllium oxide doped with 0.005 to 0.5 mol percent of at least one activator selected from the group consisting of lithium, sodium and potassium.

3. A process for the production of the phosphor for a thermoluminescent radiation dosimeter claimed in claim 1, comprising mixing at least one material selected from the group consisting of beryllium oxide and beryllium sulfate with at least one activator selected from the group consisting of lithium, sodium and potassium and the oxides, hydroxides, nitrates, sulfates, carbonates and chlorides thereof and at least one activator selected from the group consisting of silicon oxide and germanium oxide, shaping said mixture by press molding, sintering the mixture at a temperature of 1,500° to 2,100° C. in an oxidizing atmosphere.

4. A process for the production of the phosphor for a thermoluminescent radiation dosimeter claimed in claim 2, comprising mixing at least one member selected from the group consisting of beryllium oxide and beryllium sulfate with at least one activator selected from the group consisting of lithium, sodium, potassium, and the oxides, hydroxides, nitrates, sulfates, carbonates and chlorides thereof, shaping said mixture by press molding, sintering the mixture at a temperature of 1,500° to 2,100° C. in an oxidizing atmosphere.

5. A process for the production of a phosphor for a thermoluminescent radiation dosimeter, which comprises mixing a material beryllium oxide with at least one activator selected from the group consisting of lithium, sodium, potassium, and the oxides, hydroxides, nitrates, sulfates, carbonates and chlorides thereof, shaping said mixture by press molding, sintering the mixture at a temperature of 1,500° to 2,100° C. in an oxidizing atmosphere and coating the surfaces of the resultant shaped phosphor with a glass.

6. A process for the production of a phosphor for a thermoluminescent radiation dosimeter, which comprises mixing a material beryllium oxide with at least one activator selected from the group consisting of silicon oxide and germanium oxide, shaping said mixture by press molding, sintering the mixture at a temperature of 1,500° to 2,100° C. in an oxidizing atmosphere and coating the surfaces of the resultant shaped phosphor with a glass.

7. A method for producing a thermoluminescent radiation dosimeter phosphor comprising:
   mixing at least one material selected from the group consisting of beryllium oxide and beryllium sulfate with
   at least one member selected from the group consisting of materials which provide either lithium, sodium, potassium, silicon, germanium, tin, zinc, cadmium, aluminum, thallium, vanadium or ytterbium as activator,
   shaping said mixture by press molding, and
   thereafter sintering the mixture at a temperature of 1,500° to 2,100°C.

8. A process for producing a thermoluminescent radiation dosimeter phosphor comprising:
   mixing at least one material selected from the group consisting of beryllium oxide and beryllium sulfate with
   at least one activating material selected from those which provides either lithium, sodium, potassium, silicon, germanium, tin, zinc, cadmium, aluminum, thallium, vanadium or ytterbium,
   sintering the mixture at a temperature of 1,500°-2,100° C. in an oxidizing atmosphere,
   shaping thus sintered product by press molding and
   coating the molded product with glass.

9. A process for producing a thermoluminescent radiation dosimeter phosphor comprising:
   mixing at least one material selected from the group consisting of beryllium oxide and beryllium sulfate with
   at least one activating material selected from those which provides either lithium, sodium, potassium, silicon, germanium, tin, zinc, cadmium, aluminum, thallium, vanadium or ytterbium,
   sintering the mixture at a temperature of 1,500°-2,100° C. in an oxidizing atmosphere and
   shaping and solidifying thus sintered product with a binder of glass.

* * * * *